(12) United States Patent
Koseki et al.

(10) Patent No.: US 8,783,223 B2
(45) Date of Patent: Jul. 22, 2014

(54) OIL PAN

(75) Inventors: Yukio Koseki, Susono (JP); Motoichi Murakami, Gotenba (JP); Norio Inami, Susono (JP); Ryuji Koike, Susono (JP)

(73) Assignee: Toyota Jidosha Kabushiki Kaisha, Aichi (JP)

( * ) Notice: Subject to any disclaimer, the term of this patent is extended or adjusted under 35 U.S.C. 154(b) by 329 days.

(21) Appl. No.: 13/266,682

(22) PCT Filed: Apr. 30, 2009

(86) PCT No.: PCT/JP2009/058527
§ 371 (c)(1),
(2), (4) Date: May 4, 2012

(87) PCT Pub. No.: WO2010/125685
PCT Pub. Date: Nov. 4, 2010

(65) Prior Publication Data
US 2012/0204828 A1    Aug. 16, 2012

(51) Int. Cl.
*F01M 11/02* (2006.01)
*F01M 11/00* (2006.01)
*F16N 19/00* (2006.01)
*F02B 77/11* (2006.01)

(52) U.S. Cl.
CPC ............ *F01M 11/0004* (2013.01); *F02B 77/11* (2013.01); *F16N 19/00* (2013.01)
USPC .................................. 123/196 R; 123/195 C

(58) Field of Classification Search
CPC .................. F01M 11/0004; F01M 2011/0016; F01M 9/106; B01D 17/0211; B01D 17/047; F02B 77/13; F02B 77/11; F16N 19/00; F16N 39/00; F16N 31/004
USPC ............................. 123/195 C, 196 R; 184/6.5
See application file for complete search history.

(56) References Cited

U.S. PATENT DOCUMENTS 3,747,800 A * 7/1973 Viland .......................... 220/723

FOREIGN PATENT DOCUMENTS

| JP | 62-143053 U | | 9/1987 |
|---|---|---|---|
| JP | 6-53744 U | | 7/1994 |
| JP | 6-212937 A | | 8/1994 |
| JP | 8-177448 A | | 7/1996 |
| JP | 9-77183 A | | 3/1997 |
| JP | 11-50828 A | | 2/1999 |
| JP | 11079283 A | * | 3/1999 |
| JP | 2006-214455 A | | 8/2006 |
| JP | 2007-113544 A | | 5/2007 |
| JP | 2007-120444 A | | 5/2007 |

* cited by examiner

*Primary Examiner* — Noah Kamen
(74) *Attorney, Agent, or Firm* — Sughrue Mion, PLLC

(57) ABSTRACT

The present invention is provided with a configuration which makes it possible to inhibit contact between an oil (L) and a gas in an oil pan (10*a*) properly. The oil pan (10*a*) according to the present invention contains a film (S1) which covers an oil surface (F) of the oil (L) to separate the stored oil (L) and the gas above the oil (L). The film (S1) can float by receiving buoyancy in the oil (L). The film (S1) may be formed of a liquid. The film also may be configured by a film member.

11 Claims, 6 Drawing Sheets

OIL PAN

CROSS REFERENCE TO RELATED APPLICATIONS

This application is a National Stage of International Application No. PCT/JP2009/058527 filed Apr. 30, 2009, the contents of all of which are incorporated herein by reference in their entirety.

TECHNICAL FIELD

The present invention relates to an oil pan for inhibiting oil deterioration, and particularly to an oil pan which is located at a lower part of an operating machine such as an engine.

BACKGROUND ART

Conventionally, a baffle plate made of a metal is attached to an oil pan by welding or bolting to inhibit rocking of a liquid surface of an oil (oil surface) in the oil pan of an engine, and to prevent occurrence of air bubbles in the oil.

However, such a baffle plate is fixed to the oil pan, and therefore, cannot sufficiently respond to the fluctuation of the oil surface in the oil pan. Therefore, Patent Literature 1 proposes to place a plate-shaped float in an inside of the oil pan, which covers the oil surface of this inside. The float is configured to contain a core member of a metal in a styrene foam, and form a through-hole therein.

Further, Patent Literature 2 discloses that a float member is floated on an oil surface in a tube casing attached in an oil pan. The tube casing is porous, and is attached to the oil pan substantially perpendicularly to the liquid surface by using a fixture so as to surround the float member from four sides. The float member includes a porous sheet of sponge or the like, a foamed sheet as buoyancy means which is affixed on a top surface of the porous sheet, and a wire gauge for reinforcement which is affixed on an undersurface of the porous sheet. The float member is provided with a hole for an oil strainer to pass through, and in particular, the foamed sheet is provided with a plurality of air bubbles and a plurality of oil drop holes over the entire surface thereof.

Further, Patent Literature 3 discloses that a plurality of float members which are connected to each other are floated on an oil surface in an oil pan so as to enhance followability to rocking and waviness of the oil surface in an oil pan. The plurality of the float members are connected to a wire-shaped locking member having both ends connected and fixed to an oil pan inner wall surface. More specifically, each of the float members is attached to the lattice point at which two locking members intersect each other to have gaps from the other float members.

Furthermore, Patent Literature 4 discloses to provide a number of floating bodies in an oil pan, which are composed of small pieces of particulate matters with the specific gravity smaller than that of the oil, to cover the entire area of the oil surface. The floating bodies have, for example, spherical shapes with diameters of 10 to 20 mm, or cubic shapes.

CITATION LIST

Patent Literature

PTL 1: Japanese Utility Model Laid-Open No. H6-53744 (1994)
PTL 2: Japanese Utility Model Laid-Open No. S62-143053(1987)
PTL 3: Japanese Patent Laid-Open No. 2007-120444
PTL 4: Japanese Patent Laid-Open No. H6-212937(1994)

SUMMARY OF INVENTION

Incidentally, the float members of the above-described Patent Literature 3 are disposed with gaps from one another, and therefore, cannot properly prevent the oil in the oil pan from making contact with a blowby gas. Further, the floating bodies of the above-described Patent Literature 4 also have the limitations in terms of prevention of contact between the oil and the gas.

Therefore, the present invention is made in view of the foregoing problems, and an object of the present invention is to enhance followability to rocking of an oil surface in an oil pan, and to inhibit contact between an oil and a gas properly.

An oil pan according to the present invention includes a film which covers an oil surface of an oil to separate the oil which is stored therein and a gas above the oil. The film preferably may float by receiving buoyancy in the oil. The film may be preferably composed by including a material having a specific gravity smaller than a specific gravity of the oil.

The film may be formed of a liquid. The liquid may preferably include a silicone oil.

The film may be composed of a film member. The film member may be preferably a sheet made of silicone. The oil pan which includes such a film member may preferably further include one or a plurality of support rod members, which are fixed to a bottom portion of the oil pan, inside the oil pan, wherein each of the support rod members may penetrate through an opening portion provided in the film member. The support rod member may be preferably provided with an oil drop passage. Further, the support rod member may be connected to a baffle plate, and the oil drop passage may communicate with an oil drop hole of the baffle plate. The film member may preferably include an oil deterioration inhibitor on a surface portion of the film member.

DESCRIPTION OF EMBODIMENTS

Hereinafter, embodiments of the present invention will be described based on the accompanying drawings. To begin with, a first embodiment will be described.

Figure 1:
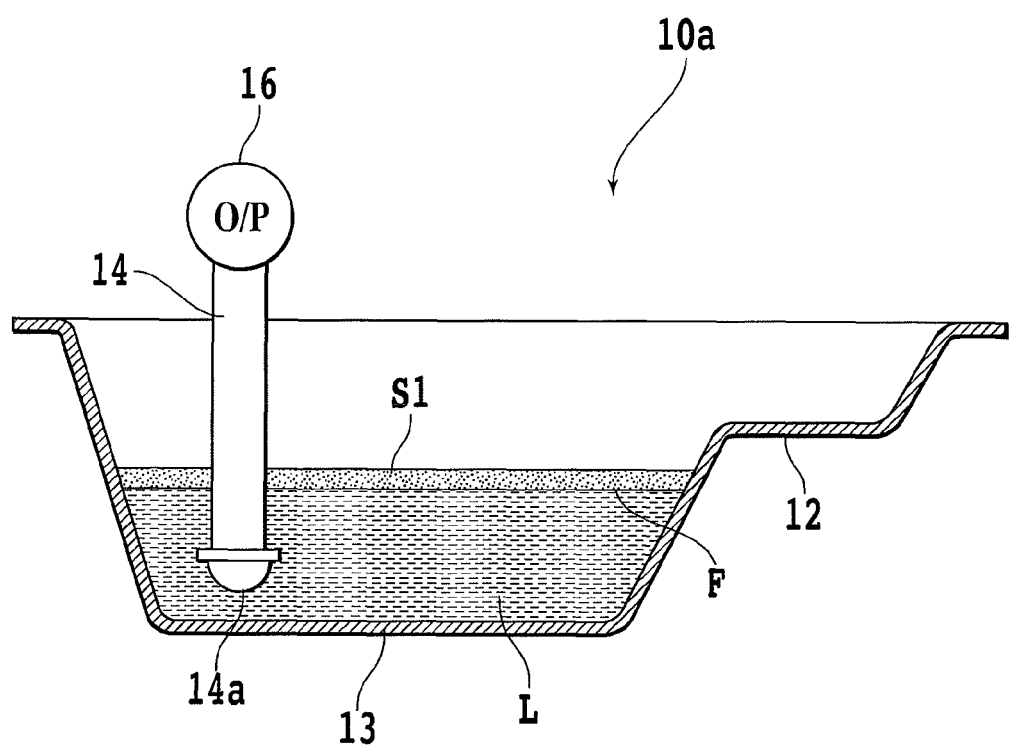
FIG. 1 is a schematic sectional view of an oil pan in a first embodiment.

FIG. 1 is a schematic sectional view of an oil pan 10*a* in the first embodiment. The oil pan 10*a* is located at a lower part of an engine. Though not illustrated, in the engine, a crankcase, a cylinder block, a cylinder head and a head cover are sequentially located at a top part of the oil pan 10*a* in FIG. 1. An outer shell of the engine is substantially configured by these members including the oil pan 10*a*. In the engine, a mixture of air aspired from an intake system and a fuel is burned in a combustion chamber. An explosive power by the combustion is transmitted to a crankshaft via a piston. The gas which is generated by the combustion of the mixture is exhausted through an exhaust system.

The cylinder block and the cylinder head of the engine are provided with one or a plurality of oil drop passages (oil return passage) which establish communications between the inside of the head cover and the inside of the crankcase. These oil drop passages are the passages for dropping an oil, which is used for lubrication or the like in a valve operable system for an intake valve and an exhaust valve or the like and remains on the cylinder head, toward the above-described oil pan 10a. However, the oil drop passage also may function as the passage for moving the blowby gas in the crankcase upward toward the inside of the head cover. The oil drop passages maybe provided to be linked to, for example, the other members so as to differ so that the oil is circulated in the engine.

The blowby gas can be defined, for example, as the gas which leaks out into the crankcase from a gap between a piston ring and a cylinder bore of the cylinder block. Therefore, the blowby gas contains oil mist as a gas generated by agitation and evaporation of the oil in the crankcase in addition to HC (hydrocarbon) which is a fuel component, NOx and SOx contained in a burned gas, and a moisture. Accordingly, as a result that a gas above an oil surface F in the oil pan 10a, which contains such a blowby gas, makes contact with and mixes into the oil, deterioration of the oil advances. Therefore, in this case, the deterioration of the oil is inhibited by inhibiting such a contact between the gas and the oil as described as follows. In general, such a blowby gas is forcefully returned to the intake system by using the intake negative pressure, and is fed to the combustion chamber.

Returning to FIG. 1, the oil pan 10a in the first embodiment will be described. The oil pan 10a is configured as a molded product of a metal plate. The oil pan 10a has a shallow section 12 and an oil reservoir section 13. When the oil pan 10a is horizontally placed, an oil L within the oil pan 10a does not reach the shallow section 12 and stays in the oil reservoir section 13 in general. The oil L stored in the oil pan 10a of the engine is sucked up by an oil pump 16 through an inlet port 14a of an oil strainer 14, and is fed to an engine main body part by pressure. More specifically, thereby, the oil L is supplied to bearing portions and slide portions inside the engine, and is used for lubrication or the like in these portions. The oil L which is used for lubrication or the like flows down to the oil pan 10a by gravity drop or the like through the above-described oil drop passage. In this manner, the oil L is circulated in the engine.

In FIG. 1, a film S1 is formed on the oil surface F which is the liquid surface of oil in the oil pan 10a. The oil pan 10a in the first embodiment receives therein a liquid as a film-forming substance. That is to say, the film S1 is a liquid film, and is formed of the liquid. The liquid has a specific gravity smaller than the specific gravity of oil so as to be able to float on the oil L. Therefore, the liquid, that is, the film S1 formed of the liquid can float by receiving buoyancy in the oil. However, in order that the entire oil surface F is covered with the film S1, the liquid for forming the film S1 is preferably a liquid having a suitable viscosity. More specifically, the film S1 is composed of a silicone oil. The silicone oil is chemically stable with respect to an oil. Furthermore, the silicone oil is also thermally stable. However, the film S1 may be formed of another liquid substance that has a specific gravity smaller than the specific gravity of the oil L, and is chemically and thermally stable with respect to the oil L. The quantity of the liquid such as the silicone oil which is received in the oil pan 10a for forming the film S1 is preferably a quantity to the extent of being able to properly cover the oil surface F even if the liquid for forming the film S1 decreases in the oil pan 10a by being partially sucked up by the oil pump 16.

In order to thus form the film S1 on the oil surface F in the oil pan 10a, the liquid as described above is poured into the oil pan 10a. Receiving the liquid may be carried out after the oil L is poured into the inside of the engine and the inside of the oil pan 10a, or may be carried out before the oil L is poured into them.

Since the film S1 is formed of the liquid, the oil L which is used for lubrication or the like in the valve operating system is returned to the oil reservoir section 13 in the oil pan 10a to break through the film S1 from various sites. Subsequently, the film S1 which is broken through by the oil L can properly cover the oil surface F again through collection and spread of the liquids for forming the film S1 in such a manner that oil separates from water to cover the water surface.

The film S1 which covers the oil surface F acts to separate the gas located above the oil (gas over the oil surface), more specifically, the above-described blowby gas from the oil L (separate the oil stored in the oil pan 10a and the gas above the oil). Since the film S1 is formed of the above-described liquid, the film S1 can exhibit high followability to rocking of the oil surface F. As a result, the film S1 can properly inhibit contact between the oil L and the gas. Accordingly, by use of the oil pan 10a in the first embodiment, the deterioration of the oil L can be properly inhibited.

FIG. 1 schematically shows the oil pan 10a, the oil strainer 14 and the oil pump 16. Therefore, a shape of the oil pan 10a, a shape and a size of the oil strainer 14, a position of a pipe of the oil strainer 14, which is raised to the oil pump 16, an installation position of the oil pump 16 and the like are not limited to the aforementioned description and FIG. 1, and can be variously modified. Such various modifications also can be applied to the other embodiments which will be described as follows.

Next, an oil pan 10b in a second embodiment according to the present invention will be described. The oil pan 10b in the second embodiment has substantially the same configuration as the above-described oil pan 10a except for the substance received in the oil pan to form a film on the oil surface. Therefore, hereinafter, the features of the oil pan 10b which the above described oil pan 10a does not include will be mainly described. Some of the components of the oil pan 10b which are the same or substantially same as the above-described components are assigned with the same reference symbols as those of the above described components or the reference symbols corresponding to them, and thereby, the description of them is omitted.

Figure 2:
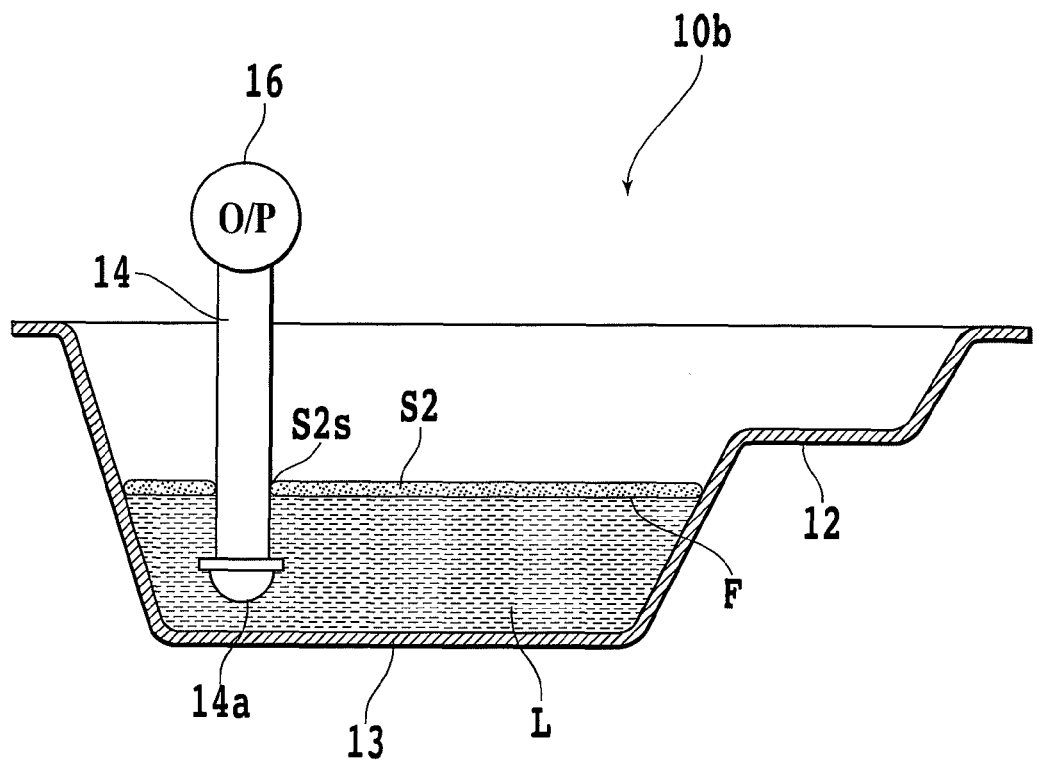
FIG. 2 is a schematic sectional view of an oil pan in a second embodiment.
Figure 3:
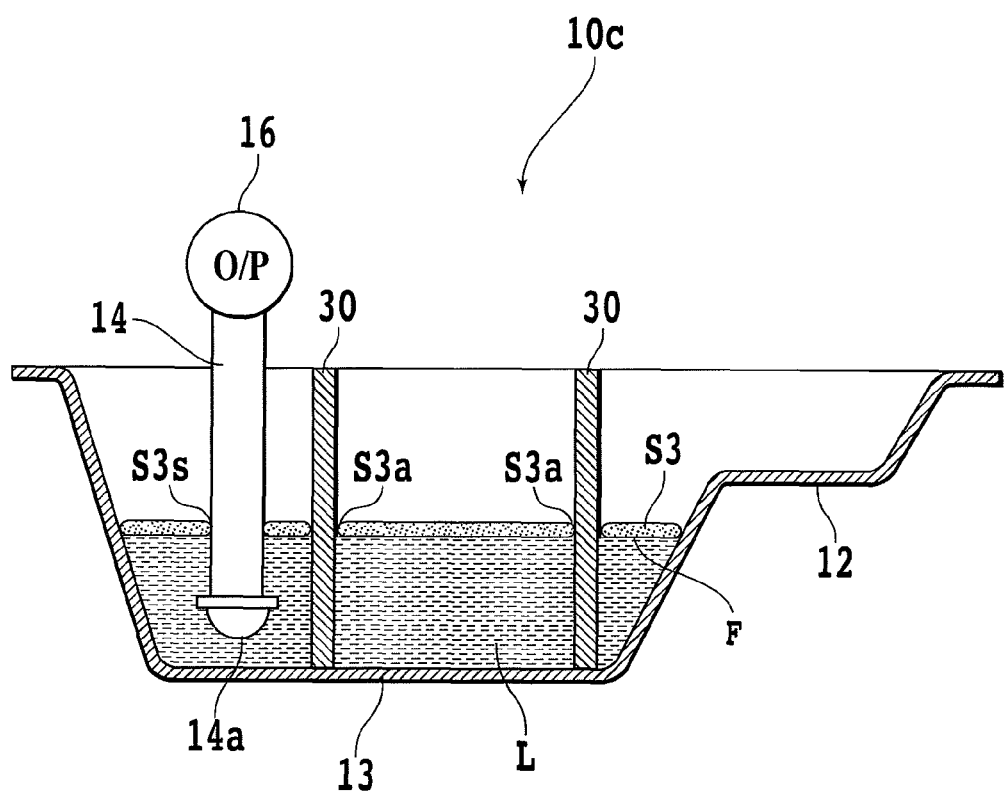
FIG. 3 is a schematic sectional view of an oil pan in a third embodiment.

The oil pan 10b is schematically expressed in FIG. 2. A film member S2 is received in the oil pan 10b so as to form a film, which is chemically stable and thermally stable with respect to the oil L, on the oil surface F in the oil pan 10b. That is to say, in the second embodiment, the substance which is received in the oil pan 10b to form the film on the oil surface F in the oil pan 10b is the film member S2. The film member S2 is configured to be able to float on the oil surface F within the oil pan 10b. The film member S2 is configured by including a material having a specific gravity smaller than the specific gravity of the oil L so as to be able to float by receiving buoyancy in the oil L. This allows the film member S2 to be composed of only the material having a specific gravity smaller than the specific gravity of the oil L. The film member 2 may be further given buoyancy by including air bubbles therein.

The film member S2 is configured as a sheet made of silicone, and is configured by using a silicon material, more specifically, a silicone material such as a silicone rubber or a silicone resin as a main component. Such a film member S2 is a solid member in this case, but may be a semi-liquid (gelatinous) member. The film member may be composed of only a silicon material. Further, the film member may be composed of only a material other than a silicon material.

The film member S2 has the size and the shape conforming to the inner shape of the oil pan 10*b* so as to cover substantially a whole of, preferably the whole of the oil surface F. The film member S2 is provided with an opening portion S2*s* for the oil strainer 14 to pass through.

The film member S2 is impermeable to the oil, and is also impermeable to a gas. Therefore, the oil which flows down to the oil pan 10*b* can merge with the oil which is stored in the oil reservoir section 13 from the edge portion of the film member S2. The film member S2 may be provided with one hole or a plurality of holes through which the oil can pass.

Such a film member S2 is thin and in a film form, and works as a barrier film to separate the gas from the oil. Such a film member S2 has flexibility. Accordingly, the film member S2 has high followability to rocking of the oil surface F, and can properly inhibit contact between the oil and the gas.

Next, an oil pan 10*c* in a third embodiment according to the present invention will be described. The oil pan 10*c* in the third embodiment further includes a support rod member in addition to the configuration of the above-described oil pan 10*b*. In order to conform to this, a film member which is received in the oil pan 10*c* has the features corresponding to the support rod member. Except for the differences, the oil pan 10*c* has substantially the same configuration as the oil pan 10*b*. Therefore, hereinafter, the features of the oil pan 10*c* which the above-described oil pan 10*b* does not have will be mainly described. Some components of the oil pan 10*c* which are the same or substantially the same as the above-described components are assigned with the same reference symbols as the above-described components or the reference symbols corresponding to them, and thereby, the description of them is omitted.

The oil pan 10*c* includes two support rod members 30 which are fixed to a bottom section of the oil pan 10*c* so as to rise substantially perpendicularly from the bottom portion of the oil pan 10*c*. Fixation of the strut members 30 to the oil pan 10*c* can be performed by chemical or mechanical mounting means such as welding, bonding, or bolting. Each of the support rod members 30 penetrates through a film member S3 which is configured substantially similarly to the above-described film member S2. More specifically, the film member S3 includes opening portions S3*a* through which the support rod members 30 penetrate. However, the number of support rod members 30 may be one, three or more. One support rod member 30 is preferably linked to one opening portion S3*a*.

In this manner, the support rod members 30 which penetrate through the film member S3 which covers the oil surface F are attached to the oil pan 10*c*. Accordingly, the support rod members 30 can work to restrict the movement of the film member S3. Therefore, even if the oil surface F rocks, the film member S3 can continue to spread more stably on the oil surface F. Accordingly, the film member S3 can properly suppress contact between the gas and the oil.

Next, an oil pan 10*d* in a fourth embodiment according to the present invention will be described. The oil pan 10*d* in the fourth embodiment includes support rod members 42 each having an oil drop passage 40. A baffle plate 44 is attached to the support rod member 42. Other than this, the oil pan 10*d* has the configuration substantially similar to that of the oil pan 10*c*. Thus, hereinafter, the features of the oil pan 10*d* which the above-described oil pan 10*c* does not have will be mainly described. Some of the components of the oil pan 10*d* which are the same or substantially the same as the above-described components are assigned with the same reference symbols as the above described components or the corresponding symbols to them, and thereby, the description of them is omitted.

Also in the fourth embodiment, a film member S4 which has a substantially similar configuration as the film member S3 is also received in the oil pan 10*d* to cover the oil surface F. In this case, a plurality of support rod members 42 are attached (fixed) to the oil pan 10*d* by chemical or mechanical mounting means such as welding, bonding or bolting, so as to penetrate through opening portions S4*a* of the film member S4. The support rod member 42 is formed to be hollow. An inner wall portion of the support rod member 42 defines an oil drop passage 40. The oil drop passage 40 extends along an axial line of the support rod member 42 to connect an upper opening portion 42*a* and a lower opening portion 42*b* of the support rod member 42. The upper opening portion 42*a* is located at the support rod member 42 to be positioned above the oil surface F, whereas the lower opening portion 42*b* is located at the support rod member 42 to be positioned below the oil surface F.

The baffle plate 44 is connected to the support rod member 42. Here, the baffle plate 44 is supported by a plurality of the support rod members 42, and is fixed to the plurality of the support rod members 42 by chemical or mechanical mounting means such as welding, bonding or bolting. Therefore, the baffle plate 44 is held within the engine without being directly attached to the oil pan 10*d*, or without being attached to the crankcase not illustrated. An oil drop hole 44*a* of the baffle plate 44 is located to communicate with the oil drop passage 40 of the support rod member 42. Accordingly, the oil which has reached onto the baffle plate 44 passes through the film member S4 through the oil drop passage 40 to be returned to the oil reservoir section 13 of the oil pan 10*d* (refer to the arrows in FIG. 4). The oil is thus returned to the oil reservoir section 13 of the oil pan 10*d* via the baffle plate 44, and therefore, occurrence of air bubbles in the oil can be more properly inhibited.

Figure 4:
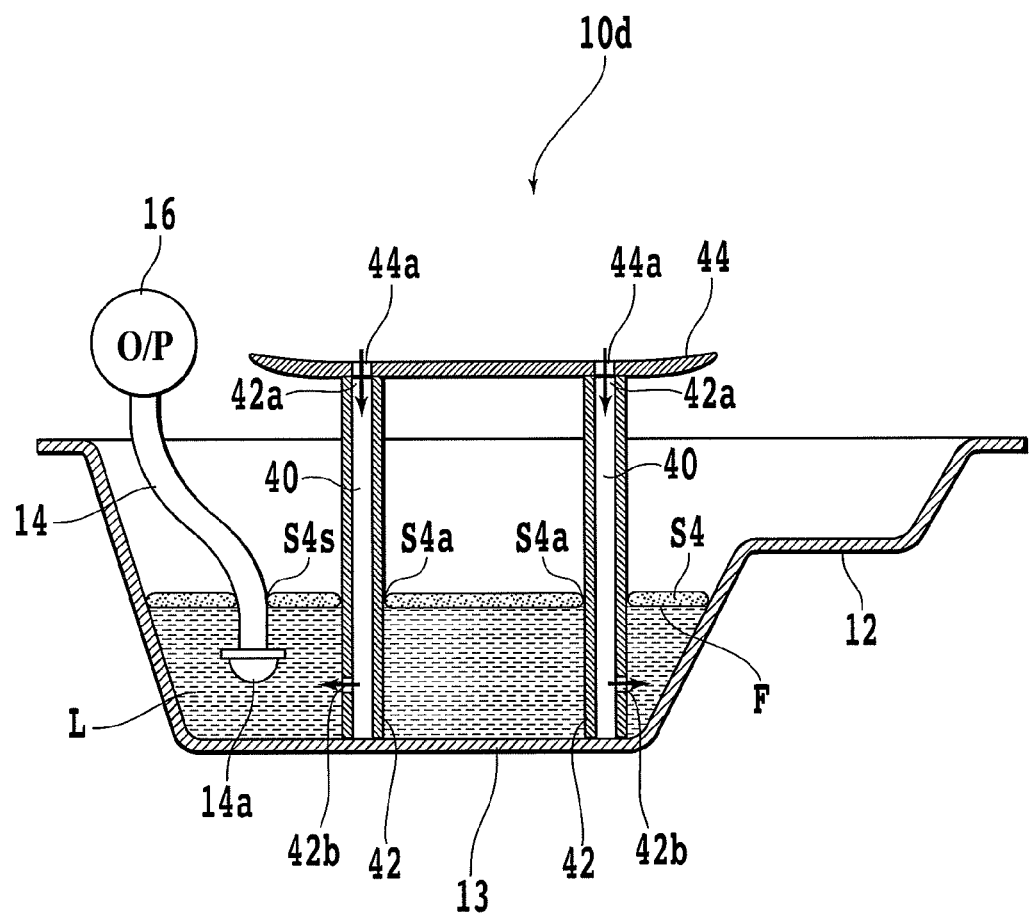
FIG. 4 is a schematic sectional view of an oil pan in a fourth embodiment.

It should be noted that FIG. 4 shows that the baffle plate 44 is located outside the oil pan 10*d*, but it may be located inside the oil pan 10*d*. The position of the baffle plate 44 may be set from the relation with the rotation track of the crankshaft not illustrated or the cylinder block structure. Further, the baffle plate 44 may be directly attached to the oil pan 10*d* or the crankcase by chemical or mechanical mounting means. Furthermore, although the baffle plate 44 is configured to be narrower than the oil surface F of the crankcase 10*d* in FIG. 4, but it may have such a size and a shape as to cover the oil surface F entirely.

Next, an oil pan 10*e* in a fifth embodiment according to the present invention will be described. The oil pan 10*e* in the fifth embodiment has a hollow guide 50 which penetrates through a film member S5. Other than this, the oil pan 10*e* has the configuration substantially similar to the oil pan 10*c*. Therefore, hereinafter, the features of the oil pan 10*e* which the above-described oil pan 10*c* does not have will be mainly described. Some of the components of the oil pan 10*e* which are the same or substantially the same as the above-described components are assigned with the same reference symbols as the above described components or the corresponding reference symbols to them, and the description thereof is omitted.

Also in the fifth embodiment, the film member S5 which has the configuration substantially similar to the film member S3 is received in the oil pan 10e to cover the oil surface F. Here, a plurality of support rod members 30 are attached to the oil pan 10e by chemical or mechanical mounting means such as welding, bonding or bolting to penetrate through opening portions S5a of the film member S5.

Figure 5:
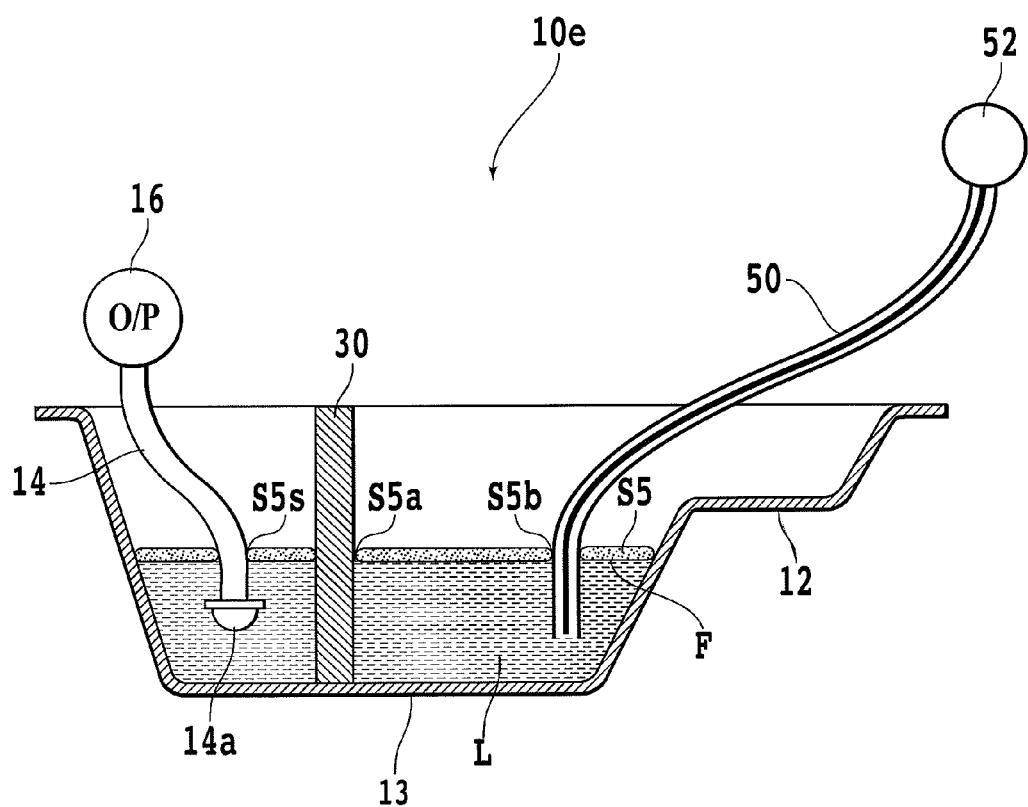
FIG. 5 is a schematic sectional view of an oil pan in a fifth embodiment.

The film member S5 is designed to allow not only the support rod member 30 but also the hollow guide 50 to pass through it. In the fifth embodiment, an oil level gauge 52 is inserted in the hollow guide 50. FIG. 5 shows that an opening portion S5b through which the hollow guide 50 passes, and an opening portion S5a through which the support rod member 30 passes have substantially the same size. However, the sizes and the shapes of these opening portions S5a and S5b may be changed in accordance with objects intended to be passed through them. Further, the sizes, the shapes and the like of the opening portions S5a and S5b may differ depending on the individual opening portions. It should be noted that the hollow guide 50 is schematically shown in FIG. 5, and it may extend various locations of the engine. Further, the hollow guide 50 may be used for an application other than insertion of the oil level gauge.

Figure 6:
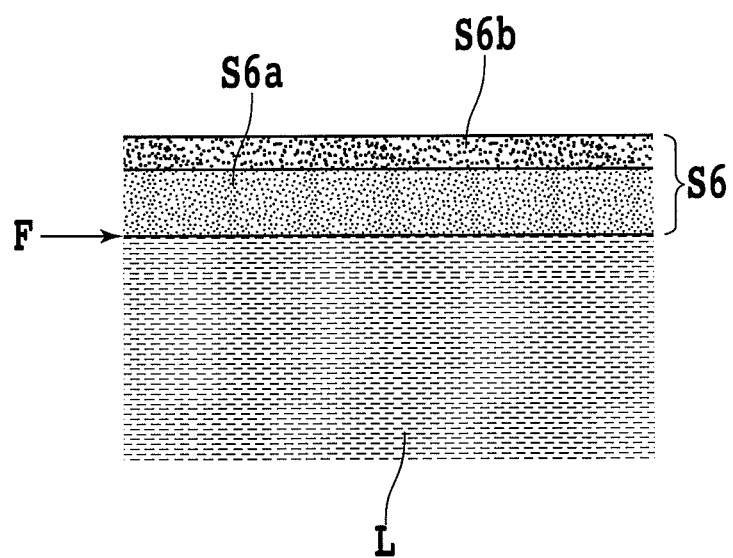
FIG. 6 is a schematic sectional view of a part of a film member housed in an oil pan in a sixth embodiment.

Next, an oil pan 10f in a sixth embodiment according to the present invention will be described. The oil pan 10f in the sixth embodiment includes a film member S6 provided with an oil deterioration inhibition layer. Other than this, the oil pan 10f has the configuration substantially similar to the oil pan 10b in the above-described second embodiment. Therefore, hereinafter, only the features of the film member S6 will be described by using FIG. 6 which schematically shows a cross section of a part of the film member S6 which floats on the oil surface F. Hereinafter, the components of the oil pan 10f which are the same or substantially the same as the above-described components are assigned with the same reference symbols as the above-described components or the reference symbols corresponding to them, and thereby, the description of them is omitted.

The film member S6 is configured of a first layer S6a substantially corresponding to the film member S2 in the second embodiment, and a second layer S6b as the oil deterioration inhibition layer. The second layer S6b is provided on the surface portion of the film member S6 to contain an oil deterioration inhibitor. The second layer S6b is overlaid on the first layer S6a to cover a surface of the first layer S6a located at the crankshaft side (surface located on the crankcase side). The second layer S6b is integrated with the first layer S6a by being coated thereon. The second layer S6b may be formed to cover the entire surface of the first layer S6a or a part of it. For example, the second layer S6b may be formed to cover only an edge portion of the first layer S6a.

The second layer S6b is formed as the oil deterioration inhibition layer, and is composed of calcium carbonate as a main component in this case. The second layer S6b may be composed of only calcium carbonate. Accordingly, the second layer S6b can neutralize nitric acid derived from NOx gases. Accordingly, it is possible to inhibit deterioration of the oil due to such nitric acid. Here, as the oil deterioration inhibitor, calcium carbonate is used, but another substance, for example, an alkaline substance may be used.

It should be noted that such an oil deterioration inhibition layer may be formed on each of the film members S3, S4 and S5 of the above-described third to fifth embodiments to cover the entire or part of the surface portion.

The present invention is described based on the above-described six embodiments. However, the present invention allows the other embodiments. For example, any two or multiple embodiments of the above-described six embodiments can be combined with each other within the scope without contradiction.

The present invention is described based on the embodiments and the like thus far, but the present invention is not limited to them. All the modified embodiments, application examples, and equivalents which are included in the spirit of the present invention defined by claims are within the scope of the present invention. Accordingly, the present invention should not be interpreted restrictively, and also can be applied to any other techniques within the scope in the spirit of the present invention.

The invention claimed is:

1. An oil pan comprising:
   a film configured to cover an oil surface of an oil to be stored in the oil pan so as to separate the oil from a gas above the oil,
   wherein the film is formed of a liquid.

2. The oil pan according to claim 1, wherein the liquid contains a silicone oil.

3. The oil pan according to claim 1, wherein the film can float by receiving buoyancy in the oil.

4. An oil pan comprising:
   a film configured to cover an oil surface of an oil to be stored in the oil pan so as to separate the oil from a gas above the oil, the film being configured by a film member,
   wherein the film member is a sheet made of silicone.

5. The oil pan according to claim 4, wherein the film member can float by receiving buoyancy in the oil.

6. The oil pan according to claim 4,
   wherein the film member includes an oil deterioration inhibitor on a surface portion of the film member.

7. An oil pan comprising:
   a film configured to cover an oil surface of an oil to be stored in the oil pan so as to separate the oil from a gas above the oil, the film being configured by a film member; and
   one or a plurality of support rod members provided in the oil pan and fixed to a bottom portion of the oil pan, wherein each of the support rod members penetrates through an opening portion provided in the film member.

8. The oil pan according to claim 7, wherein the film member can float by receiving buoyancy in the oil.

9. The oil pan according to claim 7, wherein the support rod member is provided with an oil drop passage.

10. The oil pan according to claim 9,
    wherein the support rod member is connected to a baffle plate, and the oil drop passage communicates with an oil drop hole of the baffle plate.

11. The oil pan according to claim 7,
    wherein the film member includes an oil deterioration inhibitor on a surface portion of the film member.

* * * * *